May 26, 1925.
N. M. HOPKINS
1,538,992
FLASH LIGHT AND RECHARGING DEVICE FOR THE BATTERY THEREOF
Filed Dec. 20, 1920   2 Sheets-Sheet 1
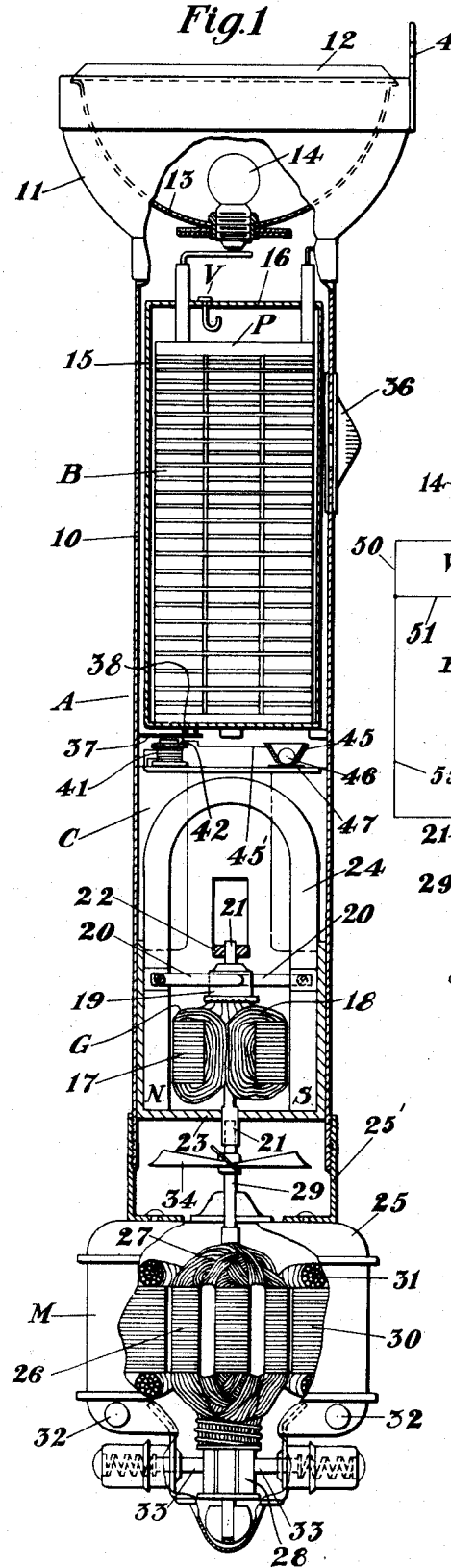
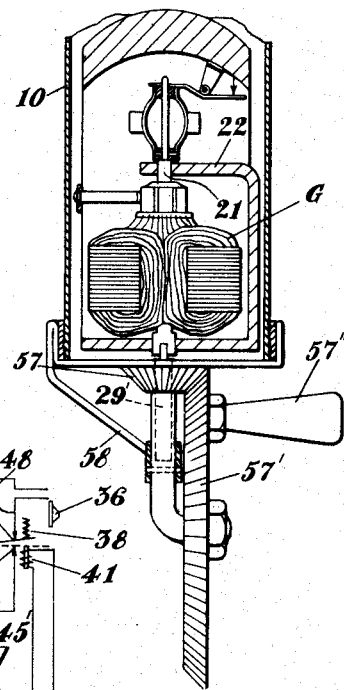
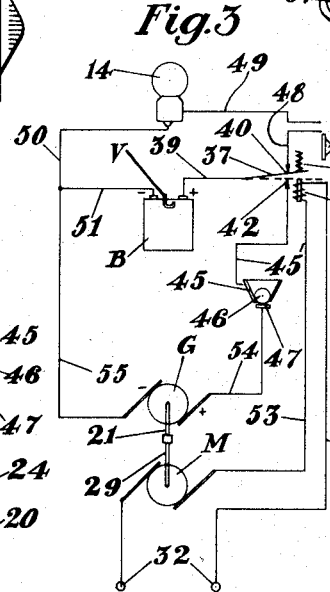
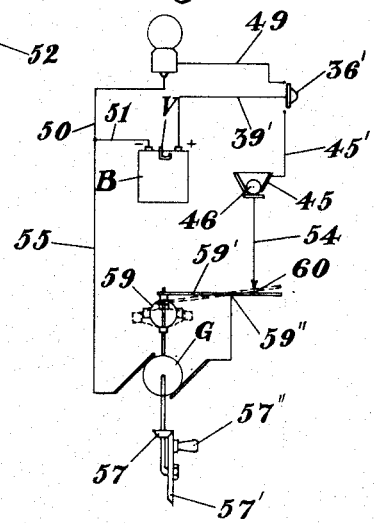
INVENTOR.
Nevil Monroe Hopkins.
BY
Byrnes Townsend & Bricksteins
ATTORNEYS.

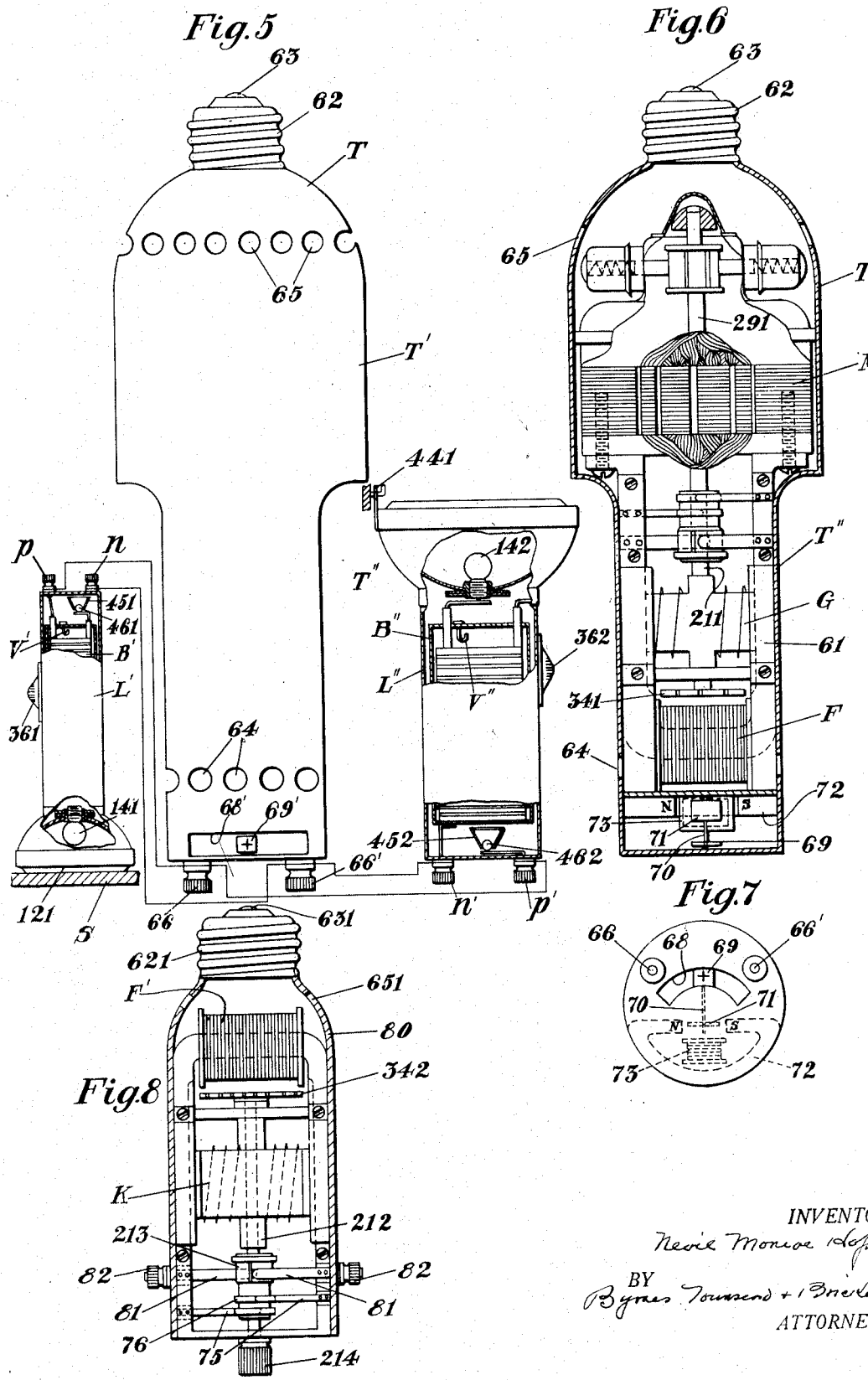

Patented May 26, 1925.

1,538,992

UNITED STATES PATENT OFFICE.

NEVIL MONROE HOPKINS, OF NEW YORK, N. Y., ASSIGNOR TO NATIONAL CARBON COMPANY, INC., A CORPORATION OF NEW YORK.

FLASH LIGHT AND RECHARGING DEVICE FOR THE BATTERY THEREOF.

Application filed December 20, 1920. Serial No. 432,021.

*To all whom it may concern:*

Be it known that I, NEVIL MONROE HOPKINS, a citizen of the United States, residing at New York, in the county of New York and State of New York, have invented certain new and useful Improvements in Flash Lights and Recharging Devices for the Batteries Thereof, of which the following is a specification.

This invention relates to portable electric lighting devices, known generally as flashlights, and battery hand or pocket lanterns. The invention is more particularly concerned with flashlights in which miniature storage or other rechargeable batteries are employed as the source of current for lighting the flashlight lamp, and with means for readily recharging such batteries. However, some of the novel features are of more general application.

Rechargeable batteries, such as storage batteries, have heretofore been employed in pocket and hand lanterns, flashlights, and the like, and are more desirable in some respects than the dry cells generally in use in such lighting devices. But flashlights and lanterns equipped with miniature storage batteries have not attained general popularity principally because it has been practically impossible for the average user to recharge the battery himself, making its maintenance about as expensive and inconvenient as the replacement of dry cells.

One of the primary objects of this invention is, therefore, to provide a portable electric lighting device embodying a battery that shall be readily rechargeable, especially by persons unfamiliar with electrical devices and circuits.

Another object of this invention is to provide a portable recharging device for flashlight storage batteries which may be conveniently carried about with the flashlight and adapted and arranged for connection to the usual electric supply circuit of a residence, hotel or other building, so that the flashlight battery may be recharged as desired by an inexperienced person wherever electric current is available.

Another object of this invention is to provide a portable electric lighting device of the above type that shall embody a flashlight or hand lantern, charging means for the storage battery thereof, and suitable switch means arranged to complete the electrical connection of the charging means to the battery only when the charging means is in operation and only when the battery is arranged so that the liquid acid electrolyte thereof will not leak out during charging.

Another object of this invention is to provide a compact portable converter adapted for recharging storage batteries, which will alternatively convert relatively high-voltage direct current or relatively high-voltage alternating current electrical energy into relatively low-voltage direct current electricity suitable for charging storage batteries.

Another object of this invention is to provide a recharging device of the above type comprising converting means or potential-reducing and rectifying means of a size adapted to be incorporated in a flashlight structure to provide a unitary portable electric lighting device, or so that it may be otherwise associated with the flashlight to constitute a combined portable outfit embodying a flashlight and a recharging means for the miniature battery thereof.

The above and other important objects and novel features of this invention will be apparent from the following description taken with the drawings which are a part of this application and in which—

Fig. 1 is a longitudinal sectional view of a portable electric lighting device or flashlight of a well known type, embodying my invention, Fig. 2 is a partial view of another flashlight embodying my invention, Figs. 3 and 4 are diagrams of the connections of the electrical circuits in the lighting devices disclosed in Figs. 1 and 2, Figs. 5 and 6 are, respectively, a side elevation and a longitudinal sectional view of another type of charging device or converter embodying my invention, Fig. 5 showing flashlights on a smaller scale, associated with the charging device disclosed, Fig. 7 is the bottom plan view of the charging device shown in Fig. 5, parts being illustrated in dotted lines and Fig. 8 is a longitudinal sectional view of another charging device embodying my invention.

In its broader aspects, my invention comprises a portable electric lighting device embodying a rechargeable battery, such as a miniature storage battery, and means whereby the battery may be readily recharged by persons who are unfamiliar with electrical devices and circuits. Such charging devices may be combined with the portable lighting device in such a manner as to form a unitary device that may be conveniently carried about with practically the same ease as the well known flashlight or portable lantern. On the other hand, the charging device may be housed in a portable casing that is separate from the casing of the flashlight but of such size that it may be conveniently carried about with the portable lighting device and associated with such lighting device more or less temporarily, by suitable electrical conductors through which charging current is supplied to the battery of the lighting device. Several desirable forms of charging devices of the above character are disclosed herein but it will be understood that the invention comprehends other suitable types of portable devices comprising means for converting relatively high-voltage electrical energy into relatively low-voltage direct current electricity suitable for charging miniature storage batteries.

Referring to the drawings, and particularly to Figs. 1 and 3, A designates a unitary portable electric lighting device embodying my invention and of the type generally known as a flashlight or pocket lamp, the term "flashlight" as herein employed, designating generally pocket and hand lamps and lanterns, and the like, usually employed as portable electric lighting devices for providing a more or less temporary light. The flashlight A has a cylindrical or other suitable casing 10 which in the present instance, is somewhat longer than the casings generally employed in flashlights carrying dry cells, the extra length of the casing forming a compartment C to house the recharging device or a portion thereof, and suitable automatically acting switch means. The forward end of the casing 10 carries a bell-shaped portion 11 that is closed at its outer end by a lens 12. The bell-shaped portion 11 of the casing contains the reflector 13 behind the lens 12 and a miniature incandescent lamp 14 mounted concentrically with and in the focus of the reflector.

The electricity for energizing the incandescent electric lamp 14 is supplied by a suitable miniature battery B disposed in the casing 10, and in the present arrangement such battery is of a type that is readily rechargeable, that is, one which may be restored to substantially its normal condition of current and voltage by suitable recharging means. The battery B is most desirably a miniature secondary or storage battery and may be of any suitable or preferred type, having a casing 15 sealed throughout, except at a vent V, to prevent the escape of the electrolyte within which the positive and negative plates P are disposed. The vent V desirably comprises a J or L shape capillary passage in a suitable tube sealed in the cover 16 of the battery case, being designed to permit the escape of gas that is generated during the charging or recharging of the battery, but during use preventing the leakage of electrolyte therethrough, even when the flashlight and battery are inverted. The positive and negative plates or electrodes P may be of any desired or preferred form and have their terminals suitably connected in circuit in a manner to be described. The miniature storage battery is accordingly a permanent part of the portable electric lighting device and is not discarded when it has become discharged, but, on the contrary, it may be recharged to substantially its initial condition of current and voltage whenever it becomes desirable or necessary to do so.

Suitable recharging apparatus and auxiliaries thereof are located in the compartment C of the flashlight casing, or only a part of such recharging apparatus may be housed in the compartment C and the other parts of the recharging apparatus may be provided with means whereby they are attachable to said casing or with other means whereby they may be permanently or temporarily structurally associated with said flashlight. As before stated, various types of devices may be employed for the purpose of recharging the storage battery B. Inasmuch as electric current supply circuits, either direct current or alternating current of relatively high-voltage are now very generally available, the more advantageous embodiments of my invention employ a recharging device that may be electrically connected to such a supply circuit, taking therefrom a comparatively small amount of electrical energy of relatively high-potential and converting such energy to relatively low-potential direct current suitable for charging the miniature flashlight battery. The term "electric current converter" or "electric current converting device" is herein employed to designate generally those devices adapted and arranged to receive either direct current or alternating current and deliver direct current of the desired potential, whether employing resistance or other potential-reducing means or not and whether employing rectifying means or not. The principles of this invention are applicable to converters which only convert direct current of high-potential to direct current of a suitable potential to charge the miniature storage battery, to converters which only convert alternating current of relatively high-potential to direct current of low-potential, and to converters which are adapted to alternatively convert either direct or alternating current of high-potential to direct current of low-potential for charging.

The particular recharging device or converter illustrated in Figs. 1 and 3 is an advantageous construction and consists of a miniature motor-generator set which is adapted to alternatively convert relatively high-voltage direct current or relatively high-voltage alternating current electrical energy into relatively low-voltage direct current electricity suitable for charging the battery B. The generator G of this motor-generator set consists of an armature 17 that comprises a bipolar or multipolar laminated core provided with a winding 18 of fine wire connected to the segments of a commutator 19 from which brushes 20 collect low-voltage direct current of 2, 4 or 6 volts, as the case may be, to be supplied through suitable electrical conductors and switches to the positive and negative poles of the battery B. The shaft 21 of the generator armature is rotatably supported in suitable bearing members 22 and 23 carried in the compartment C of the casing 10 so as to rotatably support the armature 17 in the field produced by the permanent horse-shoe electromagnet 24 secured in the compartment C and having its N and S poles on opposite sides of the generator armature. While I employ and have illustrated a permanent magnet because of its simplicity, it will be understood that the core of the magnet may be otherwise magnetized, as for example, it may consist of laminations carrying a suitable winding connected in circuit with the generator to set up the desired field flux.

Suitable means may be employed for rotating the generator armature at the proper speed to generate the desired direct current of a relatively low-voltage to be supplied to the battery B. Where electric current is available, an electric motor is most desirably employed for this purpose and in Fig. 1 I have illustrated an electric motor M directly coupled to the armature shaft of the generator G to drive the latter at the proper generating speed. The motor comprises a casing 25 that is detachably secured by suitable means such as screws to a brass bushing member 25' threaded on or otherwise mounted on the rear end of the casing 10, but it will be understood that if desired, the flashlight casing 10 may be extended so as to form a continuous casing for housing the entire charging device including the motor.

Where relatively high-voltage direct current, common on direct current distribution systems, for example 60, 100, 110 or 120 volts, is the only source of electricity available, the motor M may consist of a miniature direct current electric motor designed for the high-voltage direct current circuit upon which it is to be used. However, alternating current around 110 volts is now generally employed for residence lighting and it is, therefore, desirable that the apparatus for converting high-voltage electrical energy to low-voltage direct current for charging the battery shall be adapted to be connected to and operate from a relatively high-voltage alternating current electrical supply circuit. Where both direct current and alternating current circuits may be available for charging purposes, it is desirable that a single motor be employed which may be connected alternatively to either alternating current or direct current relatively high-voltage circuits. With this end in view, in the present converting apparatus, I employ an electric motor to rotate the generator armature that is capable of operating satisfactorily and efficiently from either direct current or alternating current supply circuits, that is, a motor which is generally known as a "universal" motor. Any suitable or preferred form of universal electric motor may be employed. The universal motor illustrated in Fig. 1 comprises an armature core 26 built up of slotted laminations in the usual manner and provided with an armature winding 27 that is connected to the segments of a commutator 28, all carried by the armature shaft 29 that is mounted in suitable bearings in the motor casing 24 and the inner end of which may be angular and project into a similar angular socket in the outer end of the generator armature shaft 21 to thereby couple the shafts 21 and 29 together. The field core 30 of the motor M is also laminated, being desirably built up of annular slotted laminations so as to eliminate eddy currents and heating when the motor is connected to an alternating current supply circuit. The core 30 carries a suitable field winding 31 desirably connected in circuit with the armature winding 27 in a manner well understood. The conductors of the alternating current supply circuit may be connected to suitable binding posts 32 on the motor casing and by suitable conductors shown in the diagram, Fig. 3, the circuits are completed within the motor casing to the field winding 31 and to the brushes 33 which bear on the commutator 28. The motor casing and the flashlight casing may be provided with openings, and suitable cooling means such as a fan blade 34 on the armature shaft 29 may be employed to circulate air through such openings and through the converting apparatus to prevent overheating thereof, but in some types of converting apparatus such cooling means may be omitted without sacrificing any advantages of the invention.

When the battery B is charged, the lamp 14 may be lighted or flashed by operating the usual or any preferred form of switch 36 that is carried by the casing 10 and is arranged to close the electrical circuit including the storage battery and lamp. This circuit contains another switch 37, which by the aid of a spring 38 or other suitable means, is normally held in position to electrically connect the conductor 39 leading from the battery to the contact 40 connected to one terminal of the switch 36, so that normally the operation of the switch 36 will serve to complete the battery-lamp circuit and light the lamp. When it is desired to recharge the battery, suitable means may be provided for temporarily completing the charging circuit between the low-voltage generator or other electrical device, that supplies low-voltage direct current, and the storage battery to be charged. For this purpose, a switch is employed in the charging circuit which completes the electrical connection of the converting device to the battery only when the converting device is in operation, that is, one which will act automatically to interrupt the charging circuit when the charging device no longer functions, so that the storage battery will not discharge through the electrical device employed for charging it when the charging device is idle. In the portable converting device shown in Fig. 1, the switch 37 is automatically operated and pulled away from the contact 40 against the tension of the spring 38 by a small electro-magnet 41 which is controlled by the operation of the charging device. In the present instance the coil of the magnet 41 is electrically connected in series with the motor M so that when current is supplied to the latter, the electro-magnet 41 will be energized, causing the switch member 37 to open the circuit through the contact 40 and to engage a contact 42, thereby connecting the latter which is in the charging circuit, to the conductor 39 which leads to one pole of the storage battery. Accordingly, the completion of the charging circuit depends upon the operation of the charging device or converting means.

While the storage battery is being charged, as is well known, gases are generated within the electrolyte and a suitable vent such as the vent V is usually provided in the cover of the storage battery as a relief port for such gases. The liquid electrolyte in such batteries is usually sulphuric acid and the leakage or expulsion of even a small amount of the same, is very undesirable, especially in portable lighting devices of the type herein described which are often carried about in clothing that is likely to be ruined by such acid. Accordingly, in order to prevent the expulsion of electrolyte while the gas is being evolved during charging, it is desirable to have the battery so arranged that the inner end of the vent is open to allow the gas to escape freely so that no electrolyte will leak out of the battery casing, and in the present instance, this object is attained by supporting the battery so that its vent is at the upper end or uppermost during the time that the battery is being charged. A simple means for holding the battery in a correct charging position comprises a device for suspending the lighting device, as for example, a suspension eye 44 that is secured to the outer side of the enlarged upper end 11 of the flashlight casing. Such suspension eye may be folded out of the way and when in extended position, may be used to hang the lighting device on a nail or other suitable support while the battery is being charged, thus arranging the device so that the inner end of the vent will be uncovered and no electrolyte will be expelled from the vent while the battery is gassing. The vent is of such minute size and so constructed that no electrolyte will flow therefrom while the lighting device is in use, even when the battery and lighting device are inverted.

Inasmuch as attempts may be made to charge the battery while it is not in an upright position, say when it is lying on its side, or inverted, an arrangement is provided whereby it will be impossible to charge the battery under such conditions and whereby the battery may only be charged when its vent is in such a position that the inner end of the vent is uncovered so that the electrolyte will not be expelled therefrom during the charging operation. Various means may be employed to accomplish this purpose, the one herein disclosed comprising a simple and effective gravity-operated switch means inserted in the charging circuit, and as shown, includes an inverted frustro-conical conducting shell 45 suitably mounted in the casing 10 and connected by a conductor 45' to the contact 42. A switch member in the form of a ball 46 of conducting material, is disposed in the shell 45 and is of such size as to roll freely therein and to partly project from the lower open end of the shell, to engage a contact 47 that is electrically connected to the charging device. This gravity switch is arranged so that the ball 46 engages the contact 47 to close the circuit only when the vent V of the battery is arranged or disposed so that no electrolyte will cover the inner end thereof and be expelled therefrom when the battery is being charged and is gassing. In case the directions are not followed and an attempt is made to charge the battery while the device is lying on its side, or inverted, the ball 46 will roll out of contact with the contact 47 and the charging circuit will be incomplete. No current will then flow to the battery and no electrolyte will be expelled therefrom, thus avoiding the objectionable leakage of electrolyte which would otherwise occur by an accumulation of pressure due to gassing.

The operation of my improved portable electric lighting device will be apparent from a consideration of the diagram shown in Fig. 3. Normally, the parts of the apparatus are in the position illustrated, except that the ball member 46 may be in some other position, depending upon how the lighting device is held but this is immaterial while the device is in use. In this normal position, the lamp 14 may be lighted by closing the switch 36 to complete the electrical circuit as follows: Positive terminal of the battery B, conductor 39, switch 37, contact 40, conductor 48, switch 36, conductor 49, lamp 14, conductors 50 and 51 to the negative terminal of the battery B. When the battery B is to be recharged, the lighting device is first suspended from the eye 44 or arranged so that the vent will be at the upper end of the battery or uppermost to uncover the inner end of said vent and thereby prevent discharge of electrolyte from the battery during the gassing incidental to recharging. In this position, the ball member 46 of the gravity switch will engage the contact 47. When either a relatively high-potential alternating current or a relatively high-potential direct current supply circuit is connected to the terminals 32, 32 of the motor M, current will flow through the motor to operate it and at the same time current will be supplied to the electro-magnet 41 by conductors 52 and 53, energizing the latter to attract the armature of the switch 37, moving the same to the dotted position in Fig. 3 to complete the charging circuit as follows: Positive brush of the generator G, conductor 54, contact 47, ball 46, shell 45, conductor 45', contact 42, switch 37, conductor 39, battery B, conductors 51 and 55 to the negative brush of the generator G. When the battery has been recharged, and the electric current supply is interrupted or disconnected from the binding posts 32, 32, the magnet 41 will be de-energized and the spring 38 will restore the switch 37 to its normal position in engagement with contact 40, thereby preventing the discharge of the battery through the generator and also restoring the battery-lamp circuit to the condition in which the lamp 14 may be lighted by the operation of the switch 36.

Where no electrical supply circuit is available, for the operation of an electric motor, other suitable means, such as a mechanical device, may be employed to rotate the generator at the required generating speed. In Figs. 2 and 4 I have illustrated a portable electric lighting device embodying my invention in which the generator armature is rotated by a mechanical device that is manually operable and comprises a small bevel pinion 57 on a shaft 29' coupled to the generator armature shaft 21 and meshing with a large beveled gear 57' that is arranged to be rotated by a crank 57'' secured thereto, thus providing a speed multiplying device whereby the generator armature can be driven at a comparatively high speed. The gears 57, 57' and their shafts, are suitably mounted in a bracket 58 that is threaded at its forward end or otherwise arranged to be readily attachable to a co-operating part on the rear end of the flashlight casing.

In the lighting device of Fig. 2, the charging circuit is also normally open so as to prevent the discharge of the battery through the generator. The main switch of the charging circuit may be controlled by a suitable device that will close the charging circuit when the charging device is in condition to supply current to the battery and that will open the charging circuit when the battery has become charged or when the charging device has completed the charging of the battery. The particular means employed in the electric lighting device illustrated in Figs. 2 and 4 may comprise a governor device 59 of well known construction operatively associated with the armature shaft of the generator and having connected thereto a switch lever 59' pivoted at 59'' so that a part thereof is movable into engagement with the contact 60 when the generator is driven at generating speed, as illustrated in dotted lines in Fig. 4. When the charging device or generator is idle, or the battery has been charged, the governor device restores to its normal position and opens the charging circuit automatically, thereby preventing a return flow of current from the battery to the generator. A gravity or other suitable switch similar to the one illustrated in Figs. 1 and 3, is also employed to control the connection of the generator to the battery so that the latter may only be charged when the vent of the storage battery is arranged so there will be substantially no leakage of electrolyte therefrom while the battery is gassing. A single switch to control the connection of the lamp to the battery B may be employed as illustrated in Fig. 3, but in Fig. 4 I have shown another desirable arrangement which comprises a three-way switch 36'. In one position, the conductor 39' from the positive pole of the battery B is not connected to either the lamp or the charging device and in the other two positions the positive pole of the battery may be connected to either the conductor 49 or the conductor 45' which respectively lead to the lamp and to the charging device.

Figs. 1 to 4 disclose a portable electric lighting device in which an electrical converter for recharging a flashlight storage battery is so combined with the casing and other elements of the flashlight as to form a structurally unitary device that is adapted to be carried about with the low-voltage direct current generator in permanent electrical connection with the storage battery and the switches controlling the electrical connections, and in addition the generator driving means is associated with the flashlight either permanently or detachably. For some purposes it is desirable to arrange the electric converting device in an independent portable casing having terminals adapted to be electrically connected with the storage battery of the flashlight by suitable electric conductors, but such portable converting device for charging the flashlight storage battery may nevertheless be of a size adapting it to be carried about with the flashlight so that the latter may be recharged whenever desired. A converter or charging device of this type may be electrically and mechanically disconnected from the flashlight after charging so that the latter will be free of the additional weight otherwise imposed on the flashlight when the charging apparatus is unitarily combined therewith.

Figs. 5 to 8 illustrate types of portable electric lighting devices and charging devices embodying the foregoing features, showing flashlights with which the charging or converting device may be temporarily associated by means of electrical connections between the two. In the arrangement illustrated in Figs. 5 to 7, a substantially tubular converter casing T comprises an upper portion T' which is made somewhat larger in diameter than the lower portion T'', to house the universal electric motor M of the motor-generator set which constitutes the converting apparatus for supplying the charging current. The universal electric motor and the low-voltage direct current generator coupled to it may be substantially of the same construction as the set illustrated in Fig. 1, the generator being disposed in the lower, contracted portion T'' of the casing. A suitable field winding F may be provided on the field magnet core 61 also disposed in the smaller part of the casing which, when energized, furnishes the field flux for the generator armature. The frame of the motor and generator and other parts are so combined into a structural whole as to be readily inserted in the casing T. Suitable means may be provided for connecting the converter to an electric current supply circuit, and in the present arrangement, the upper end of the casing T is shown provided with a threaded neck contact 62 and a center contact 63 whereby a suitable electrical and mechanical connection may be made with an electric lamp socket or receptacle of well known construction. The contacts 62 and 63 may be electrically connected in circuit with the windings of the motor M by suitable conductors. The lower end of the armature shaft 211 of the generator may operate or carry a suitable device such as fan blades 341 by means of which air may be circulated through openings 64 and 65 in the casing and past the parts of the apparatus therein.

Flashlight batteries to be charged may either be removed from the flashlight case and mounted with the vents thereof substantially uppermost in a position to prevent expulsion of liquid electrolyte through such vents, as heretofore set forth, or the same may be retained in the case, as in the forms illustrated in Fig. 5, and the flashlight supported in a position so that the battery vents will be at the upper end of the battery, or in other words, so that the battery is disposed with its vent substantially uppermost. For example, in the flashlight L', the vent V' of the battery B' is at the base end of the flashlight casing or the end remote from the lamp 141, and in order to support this flashlight for charging, it may be mounted in an inverted position as shown, the lens 121 thereof having a flat outer face adapted to serve as an enlarged base, enabling the flashlight to be set on a flat support S, such as a table. In another example, a flashlight L'' may be provided with a suspension eye or hook 441 whereby it may be hung from suitable means, such as a nail, so that the vent V'' of its battery B'', which vent is adjacent the lamp end of the flashlight, will be adjacent the lamp 142 and uppermost when the flashlight is suspended as shown. Suitable switch means may be arranged to control the lighting of the lamps 141, 142, the electrical connection of the charging device to the battery, and to prevent the discharge of the battery through the charging device, and in all essential respects, these switches may be similar to those disclosed in Figs. 1 to 4. The gravity operated switches illustrated comprise tapering conducting shells 451 and 452 having cooperating conducting balls 461 and 462 in the flashlights L' and L'' respectively. Terminals or binding posts P, N and P', N', may be arranged on the bottom ends of the flashlight cases or elsewhere thereon so that the terminals 66, 66', respectively, of the charging device may be electrically connected through suitable conductors to the flashlight batteries in said cases. In this manner, a flashlight and its battery embodying the present invention, may be temporarily structurally associated with the charging set and when recharged, may readily be disconnected from the charging device and used independently thereof.

The polarity of the low-voltage direct current delivery terminals may be readily determined by suitable means associated with the binding posts 66, 66'. For this purpose an electrically operable indicating device may be located in the lower end of the smaller portion of the converter casing, the same comprising a segmental window 68 which may be in the bottom of the casing and through which a flag or indicator 69 is visible. The side of the casing may also have a window 68′ through which an indicator 69′ is visible. The indicators 69 and 69′ may be mounted on a pivoted rod 70 and a magnetic needle or head 71 at one end of the rod is disposed in the path of the flux between the north and south poles of a permanent magnet 72, which normally maintains the same in a balanced position and the indicators 69 and 69′ in a position intermediate the terminals 66 and 66′. The head 71 of the indicator is also subject to the influence of an electro-magnet 73, the winding of which may be electrically connected in series circuit with one of the low-voltage direct current supply conductors leading to the binding posts 66, 66′. Low-voltage direct current supplied by the charging device will thus flow through the winding 73, inducing a magnetic field, the polarity of which depends on the direction of the current therein and which field will act on the needle 71 to turn the same and unbalance the pivoted rod 70. This swings the indicators 69 and 69′ to one side or the other of their intermediate position and opposite or adjacent one or the other of the low-voltage direct current terminals 66, 66′ located adjacent opposite ends of the windows. The indicators 69, 69′ are desirably arranged to designate the positive terminal of the charging device, and may be marked with a plus sign, as shown.

Other types of electrical devices may advantageously be employed to supply the desired low-voltage direct current for recharging storage batteries of portable electric lighting devices, such as flashlights. For example, a miniature synchronous rotary converter may be designed to operate from alternating current supply mains of the voltage commonly in use in residences and to deliver low-voltage direct current suitable for charging flashlight batteries. The essentials of the theory, construction and operation of such rotary converters, as well as those of the motor-generator sets already described, are well understood by those skilled in the art to which this invention pertains, and it is therefore unnecessary to describe them in detail. Generally speaking, the rotary converter K, shown somewhat diagrammatically in Fig. 8 to illustrate this embodiment of the present invention, is designed to operate synchronously from the alternating current mains which may be suitably electrically connected to the winding of the converter, as through brushes 75, 75 which bear upon collector rings 76, 76, rotatable with and electrically connected to the converter winding. The converter may be embodied in a flashlight as a unitary part thereof, similar to the electric machine of the device illustrated in Fig. 1, for example, or the same may be housed in a separate case to be associated with the flashlight battery when the latter is to be charged. An example of the latter type of device is broadly similar to the charging device shown in Figs. 5 to 7, as illustrated in Fig. 8 in which the rotary converter K is housed in a substantially tubular metal casing 80, the upper end of which may carry suitable terminals such as a screw threaded contact shell 621 and a center contact 631, adapted to make electrical contact with the usual screw and center contacts of a lamp socket. The contacts 621 and 631 are respectively, electrically connected to the brushes 75 by suitable electrical conductors. The terminals of the generating winding of the converter may be connected to a suitable commutator 213 on the armature shaft 212, from which the desired low-voltage direct current is delivered through brushes 81, 81′ to exterior binding posts 82, 82 electrically connected to said brushes. For supplying the required field excitation, a permanent field magnet may be employed or a suitably connected field winding F′ on the field magnet core may be provided. Fan blades 342 on the armature shaft 212 may be provided to induce a circulation of air through the casing and through openings 651. Means may be provided to manually start the miniature rotary converter illustrated and for this purpose the armature shaft 212 may be provided with a projecting lower end upon which a knurled head 214 may be secured. The head 214 may be gripped and the armature spun rapidly, bringing it into synchronism with the high-voltage alternating current supply after which it will operate as a synchronous rotary converter. The charging device illustrated in Fig. 8, may also be equipped with suitable switches and a polarity indicator similar to the one employed in the charging device or converter shown in Figs. 1 to 7.

The operation of the several devices will be understood from the foregoing description. The present invention may be embodied in other types of portable electric lighting devices and recharging devices for the batteries thereof, and various changes may be made in the devices herein illustrated and described without sacrificing the advantages of the invention or departing from the principles set forth. The invention is therefore, not to be limited to the details herein shown and described.

I claim:

1. A portable electric lighting device comprising an electric lamp and a storage battery in circuit therewith having a vent, in combination with means for charging said battery, and means adapted to electrically connect said charging means to said storage battery only when the vent of said battery is arranged so as to prevent discharge of electrolyte therefrom during the gassing incidental to charging.

2. A portable electric lighting device, comprising an electric lamp and a storage battery in circuit therewith having a vent, in combination with electric current converting means for recharging said battery, and means adapted to electrically connect said converting means to said storage battery only when the vent of said battery is disposed so as to prevent discharge of liquid electrolyte therefrom during the gassing incidental to charging.

3. A portable electric lighting device, comprising an electric lamp and a storage battery in circuit therewith, having a vent, in combination with means for charging said storage battery, and automatically actuated switch means arranged to complete the electrical connection of said charging means to said battery only when said charging means is operating and only when the vent of said battery is arranged to prevent leakage of electrolyte therefrom during charging.

4. The combination with a portable electric lighting device comprising a lamp, a vented storage battery connected in circuit with said lamp, and a casing containing said lamp and battery, and recharging means associated with said lamp and battery and comprising current converting means, and switch means operable to electrically connect said converting means to said storage battery only when the vent thereof is disposed so as to prevent leakage of electrolyte therefrom during charging.

5. An electric lighting device comprising an electric lamp, a storage battery in circuit therewith having a vent, in combination with means adapted for charging said battery, such charging means being constructed and arranged to alternatively convert relatively high-potential direct current or relatively high-potential alternating current electricity into relatively low-potential direct current electricity suitable for charging said battery, and means for connecting such charging means in circuit with said battery only when the vent of said battery is arranged so as to prevent the leakage of electrolyte therefrom during the gassing incidental to charging.

6. A portable electric lighting device comprising an electric lamp, a rechargeable battery in circuit therewith, and a casing carrying said lamp and said battery, in combination with means for charging said battery comprising an electric machine carried by said casing, and driving means detachably mounted on said casing and adapted to be operatively coupled to said electric machine.

7. A portable electric lighting device comprising the combination of an electric lamp, a vented storage battery in circuit with said lamp, a casing for said lamp and battery, terminals on said casing to which a suitable battery charging device may be electrically connected, switch means controlling the electrical connection of said terminals to said battery, and means whereby said lighting device may be supported with the vent of said battery disposed so that no electrolyte will leak therefrom during charging.

8. The combination with a rechargeable battery containing an electrolyte and having a vent for the escape of gases, of means for recharging said battery, and switch means operable to electrically connect such recharging means to said battery only when said vent is disposed so as to prevent leakage of electrolyte therefrom during charging.

9. The combination with a storage battery containing a liquid acid electrolyte and having a vent for the escape of gases formed during charging, of electric current converting means for recharging said battery, and automatically operable switch means for electrically connecting said converting means to said battery only when said vent is disposed so as to prevent the discharge of liquid electrolyte therefrom during the gassing incidental to charging.

In testimony whereof, I affix my signature.

NEVIL MONROE HOPKINS.